United States Patent [19]
Gering

[11] Patent Number: 4,524,813
[45] Date of Patent: Jun. 25, 1985

[54] TIRE BREAKER APPARATUS

[76] Inventor: Julie Gering, 3203 Silva Ave., Lakewood, Calif. 90712

[21] Appl. No.: 540,002

[22] Filed: Oct. 7, 1983

[51] Int. Cl.³ .............................................. B60C 25/06
[52] U.S. Cl. .................................................... 157/1.17
[58] Field of Search ...................... 157/1.17, 1.26, 1.28

[56] References Cited

U.S. PATENT DOCUMENTS

| 2,619,158 | 11/1952 | Kohn | 157/1.17 |
| 2,655,984 | 10/1953 | Lowrey | 157/1.17 |
| 2,898,977 | 8/1959 | Denn | 157/1.17 X |

FOREIGN PATENT DOCUMENTS

| 88195 | 11/1966 | France | 157/1.26 |
| 698887 | 10/1953 | United Kingdom | 157/1.26 |

Primary Examiner—James G. Smith
Attorney, Agent, or Firm—Fulwider, Patton, Rieber, Lee & Utecht

[57] ABSTRACT

A tire breaking tool that is secured to a wheel rim for removing an oversized tire from such rim. The tool includes a holddown bar which is clamped to the wheel rim and carries a support column for a tire press having a tongue which is inserted between the tire bead area and the flange of the wheel rim. Downward movement of the tire press is effected by a pusher screw mechanism actuated by a rotatable crank arm.

8 Claims, 4 Drawing Figures

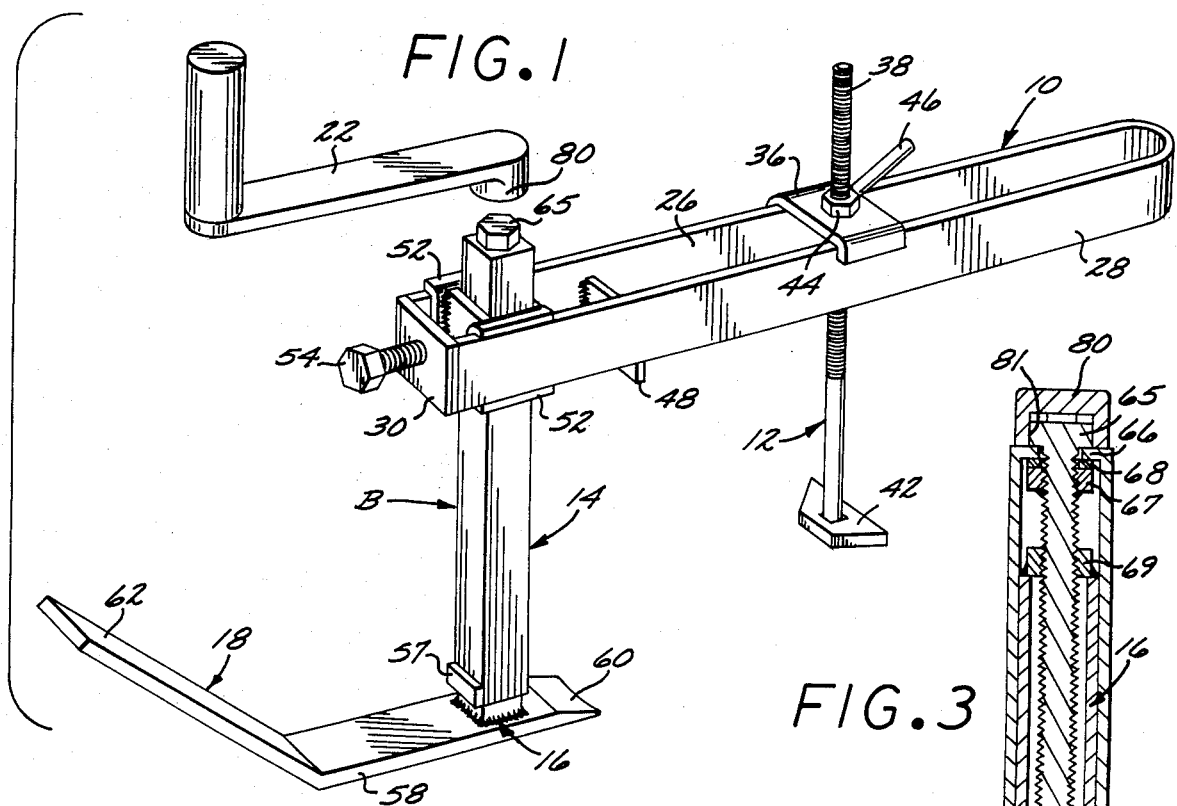
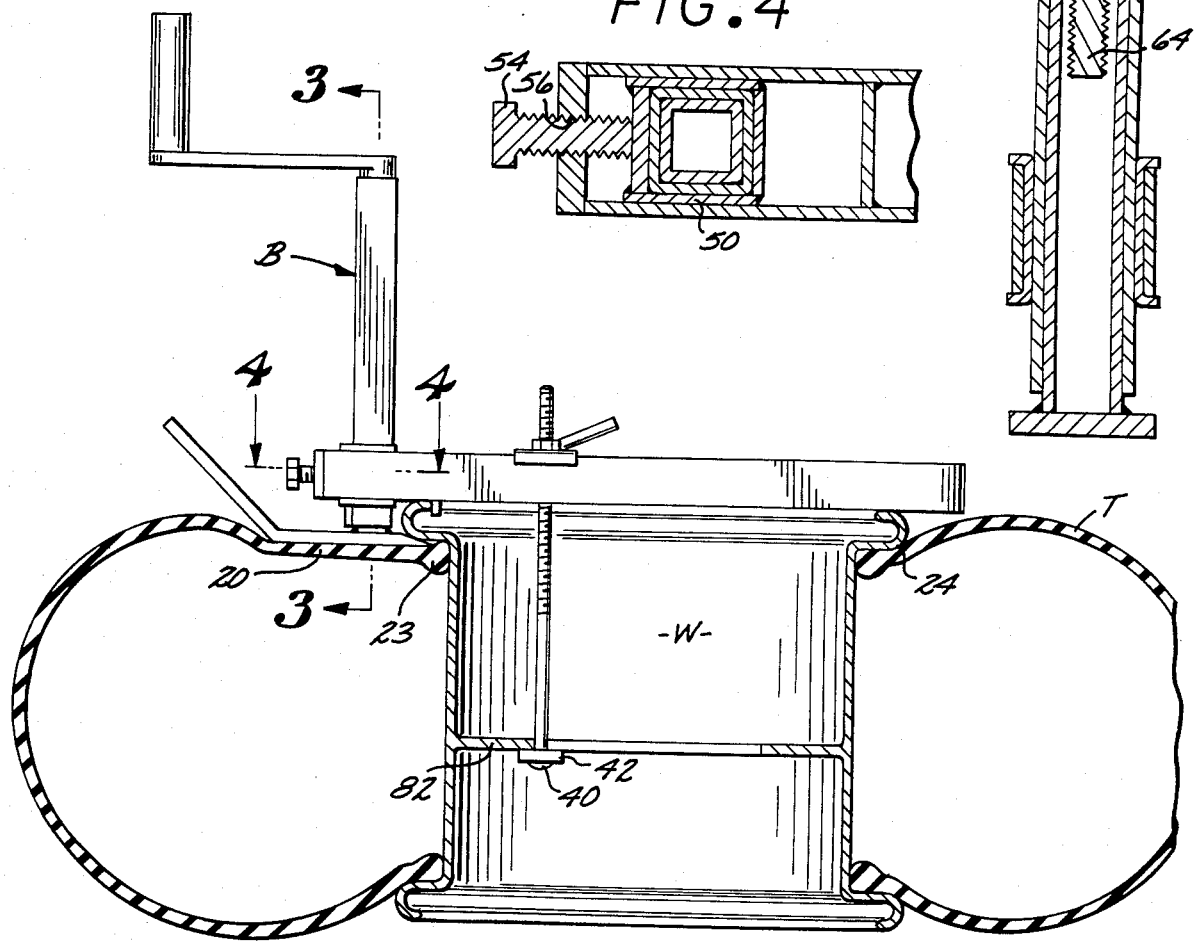

TIRE BREAKER APPARATUS

BACKGROUND OF THE INVENTION

The present invention relates to manually actuated tools for separating oversized tires from their wheel rims.

DESCRIPTION OF THE PRIOR ART

Various mechanical devices have been heretofore provided for the removal of a tire from its wheel rim. However, applicant is not aware of any prior art devices which will satisfactorily remove oversized tires from their wheel rims. Such oversized tires are utilized with off-road, all-terrain, or four-wheel vehicles. Because of the large size differential between the oversized off-road vehicle tires and conventional vehicle tires, prior art tire breaking devices are not effective to remove oversized tires from their wheel rims. Accordingly, it has been necessary to break the tire beads from the wheel rims by tedious, dangerous, and slow manual methods, generally utilizing a hammer.

SUMMARY OF THE INVENTION

It is a major object of the present invention to provide a manually operable tire breaking apparatus which will quickly and easily break the beads of an oversized tire from its wheel rim.

Another object of the present invention is to provide tire breaking apparatus of the aforedescribed nature which is simple of design and rugged of construction, whereby it will afford a long and trouble-free service life, yet which is economical of construction.

Yet a further object of the present invention is to provide tire breaking apparatus of the aforedescribed nature which may be used with various sizes of tires and wheel rims without modification.

A more particular object of the present invention is to provide tire breaking apparatus of the aforedescribed nature utilizing a holddown bar which is readily clamped to a wheel rim, with such holddown bar carrying a support column that houses a pusher screw, with rotation of such pusher screw urging a tire press downwardly against the sidewall of a tire so as to break the bead of such tire away from the wheel rim upon which it is mounted.

These and other objects and advantages of the present invention will become apparent from the following detailed description.

DESCRIPTION OF THE DRAWING

FIG. 1 is a perspective view of a tire breaker embodying the present invention.

FIG. 2 is a side elevational view showing said tire breaker clamped to a wheel rim during a tire breaking operation.

FIG. 3 is a vertical sectional view taken in enlarged scale along line 3—3 of FIG. 2.

FIG. 4 is a horizontal sectional view taken in enlarged scale along line 4—4 of FIG. 2.

DESCRIPTION OF A PREFERRED EMBODIMENT

Referring to the drawings, there is shown tire breaker apparatus B embodying the present invention which is removably attachable to a wheel rim W for breaking the bead of an oversized tire T from such wheel rim. Tire breaker apparatus B includes a holddown bar, generally designated 10, which is releasably secured to the upwardly facing side of a horizontally disposed wheel rim W by a wheel attachment clamp, generally designated 12. Holddown bar 10 also carries a tire press support column, generally designated 14, which houses a pusher tube, generally designated 16, to the lower end of which is attached a tire press, generally designated 18. The pusher tube 16 and its tire press 18 are urged downwardly by rotation of a crank arm 22 to apply a downward force against the tire sidewall 20 to thereby break tire bead 23 loose from the flange 24 of wheel rim W.

More particularly, holddown bar 10 is of an elongated U-shaped configuration with the legs 26 and 28 thereof being rigidly interconnected by an end wall 30, such end wall being welded to the free end of the legs. The wheel attachment clamp 12 includes a horizontal slider plate 36 which is longitudinally, horizontally movable along the intermediate portion of the holddown bar. Slider plate 36 carries an upright threaded post 38, the lower end of which is provided with a head 40 upon which rests an abutment plate 42. Vertical movement of the post 38 is effected by rotation of an adjustment nut 44 that rests upon slider plate 36 and is provided with a finger 46 to effect rotation of such nut. The intermediate portion of the holddown bar 10 is provided with a vertical locator plate 48 which is rigidly interposed between the legs 26 and 28 of the holddown bar, as by welding.

The tire press support column 14 is of square, tubular configuration and fits inside a generally square collar 50 (FIG. 4), which is horizontally slideable along the top of holddown bar 10. Vertical movement of the collar 50 relative to the holddown bar is prevented by outwardly extending lips 52 formed at the upper and lower sidewalls of the collar. Horizontal adjustment of the tire press support column 14 is effected by means of a horizontal adjustment screw 54 which is carried within a threaded bore 56 centrally formed in end wall 30, as shown particularly in FIG. 4. The adjustable screw 54 permits the tongue of the tire press to be at the optimum distance from the rim of the tire. This feature prevents scratching of the rim which occurs when the tongue is too close to the rim and prevents damage to the tire which occurs when the tongue is too far from the rim. A stop lug 57 is secured to the lower portion of the outer wall of column 14.

Vertically slideably disposed within tire press support column 14 is the aforementioned pusher tube 16. Pusher tube 16 is of square configuration having a snug, vertically slideable fit with the support column 14. The lower end of the pusher tube is rigidly affixed, as by welding, to the horizontal leg 58 of tire press 18. The end of the tire press 18 proximate wheel rim W is formed with a downwardly extending bevel that defines a tongue 60. The side of the horizontal leg 58 opposite bevel 60 is formed with an integral, upwardly and outwardly extending leg 62. Vertical movement of the pusher tube 16 relative to its support column 14 is effected by means of a vertical pusher screw 64 which is freely rotatable within the support column 14.

The upper portion of the pusher screw 64 has a hexagonally shaped head 65 above a ring 66 welded to the top of the pusher tube 16. Below ring 66 a nut 67 is welded to the pusher screw with a thrust washer 68 interposed between nut 67 and ring 66 whereby the pusher screw is rotatable within the support column 14, but is locked against axial movement relative thereto.

The threads of the pusher screw are engaged with a second nut 69 which is rigidly affixed as by welding within the upper portion of the pusher tube 16. Crank arm 22 is formed with a socket 80 having a hexagonally shaped recess 81 snugly engageable with the head 65 of pusher screw 64 (FIG. 3). With this arrangement, rotation of the head 65 of the pusher screw by the crank arm effects vertical movement of the pusher tube 16 relative to the support column 14.

In the operation of the aforedescribed tire breaker apparatus, air pressure is discharged from tire T as by removing the core from the tire's valve stem. The wheel rim W is positioned horizontally upon a flat surface, and the tongue 60 of tire press 18 is inserted between the tire bead 22 and the flange 24 of the wheel rim W, as indicated in FIG. 2, by depressing the side of the tire adjacent the tire press to create a gap between the tire and the rim. The adjustment screw 54 is then backed off outwardly relative to the wheel rim W. At this time the underside of the holddown bar 10 extends centrally over the upper surface of the wheel rim W. To secure the holddown bar to the wheel rim R, the abutment plate 42 is arranged with its upper surface abutting the underside of a transverse flange 82 formed at the intermediate portion of the interior of the wheel rim with the threaded post 38 extending upwardly therefrom. This can be effected by backing off the adjustment nut 44 and moving the slider plate 36 along the intermediate portion of the holddown bar. The adjustment nut 44 is then tightened utilizing finger 46.

The locator plate 42 should be engaged with the inner periphery of the top flange 24 of the wheel rim, as shown in FIG. 2. The tongue 60 of tire press 18 is given the proper adjustment by rotating the adjustment screw 54. The adjustment screw should be rotated inwardly towards the wheel rim W until the front of the tongue of the tire press touches the tire bead 22. The adjustment screw is then backed off approximately 1½ turns so that the tongue will not rub against the tire rim when the tire press is urged downwardly. Next, the crank arm 22 is engaged with the head of the pusher screw 64 and rotated so as to urge the pusher tube 16 and hence the tire press 18 downwardly. During such crank arm rotation the support column 14 will initially slide upwardly within collar 50 until the upper end of stop lug 57 abuts the underside of such collar. Further, upward movement of the support column is thereby restrained while the pusher tube 16 moves downwardly until tongue 60 breaks tire bead 23 loose from wheel rim flange 24. A clearance of approximately 1/16th inch should be maintained between the tongue and the wheel rim by the adjustment screw. Generally, it is necessary to move the tire bead downwardly no more than about 2 to 2½ inches from the wheel rim flange 24, thereby avoiding damage to the tire. The adjustment screw 54 is then backed off the tire, wheel attachment clamp 12 disengaged from the wheel rim, and the above-described procedure is repeated at sufficient additional circumferential locations around the wheel rim R to free the tire T.

It should be noted that it is a particular advantage of the tire breaker of the present invention that it may be utilized with wheel rims of varying sizes. Various sizes of wheel rims can be readily accommodated by the horizontal adjustment afforded by wheel attachment clamp 12 and adjustment nut 44. In this regard, the clamp cooperates with the locator plate in effecting proper positioning of the holddown bar on wheel rims of different widths, while the adjustment screw permits the tire press support column to be properly positioned to the wheel flange of different diameter wheel rims.

Various modifications and changes may be made with respect to the foregoing detailed description without departing from the spirit of the present invention.

I claim:

1. A tire breaking apparatus for breaking the bead of a tire from the flange of a horizontally disposed wheel rim, said apparatus comprising:
   a holddown bar that engages the upwardly facing side of said wheel rim;
   attachment clamp means horizontally slideably carried by said holddown bar to secure said bar to said wheel rim;
   a locator plate on said holddown bar engageable with said flange to limit outward horizontal movement thereof away from said flange;
   a tire press support column vertically slideably mounted on said holddown bar;
   a pusher tube vertically slideably disposed within said support column;
   threaded screw and nut means interposed between said support column and said pusher tube which effect relative vertical movement therebetween upon the application of relative rotation to said screw and nut means;
   a collar horizontally slideably carried by said holddown bar, said collar vertically slideably supporting said support column, while being restrained against vertical movement with respect to said holddown bar;
   an adjustment screw carried by said holddown bar that engages said collar to vary the horizontal position of said support column relative to said holddown bar;
   a stop lug formed on the lower portion of said support column for engagement with said collar to limit upward movement of said support column; and
   a tire press mounted on the lower end of said pusher tube, said tire press being inserted between the tire bead and the wheel rim flange to break the bead from said flange upon downward movement of said pusher tube.

2. A tire breaking apparatus as set forth in claim 1, wherein said attachment clamp means includes a slider plate horizontally movable along said holddown bar, an upright threaded post carried by said slider plate and vertically adjustable relative thereto, and an abutment plate carried by the lower end of said post for engagement with the wheel rim.

3. A tire breaking apparatus as set forth in claim 1, wherein said tire press includes a horizontal leg formed with a tongue that engages said tire bead.

4. A tire breaking apparatus as set forth in claim 1, wherein said holddown bar includes a pair of U-shaped legs connected at their free ends by an end wall, with said slider plate resting upon said legs, said collar and locator plate being disposed between said legs and with said adjustment screw being mounted upon said end plate.

5. A tire breaking apparatus as set forth in claim 2, wherein said tire press includes a horizontal leg formed with a tongue that engages said tire bead.

6. A tire breaking apparatus as set forth in claim 3, wherein said tire press includes a horizontal leg formed with a tongue that engages said tire bead.

7. A tire breaking apparatus as set forth in claim 3, wherein said holddown bar includes a pair of U-shaped legs connected at their free ends by an end wall, with said slider plate resting upon said legs, said collar and locator plate being disposed between said legs and with said adjustment screw being mounted upon said end plate.

8. A tire breaking apparatus as set forth in claim 6, wherein said holddown bar includes a pair of U-shaped legs connected at their free ends by an end wall, with said slider plate resting upon said legs, said collar and locator plate being disposed between said legs and with said adjustment screw being mounted upon said end plate.

* * * * *

UNITED STATES PATENT AND TRADEMARK OFFICE
CERTIFICATE OF CORRECTION

PATENT NO. : 4,524,813
DATED : June 25, 1985
INVENTOR(S) : Julie Gering

It is certified that error appears in the above-identified patent and that said Letters Patent is hereby corrected as shown below:

Column 2, line 3, please delete "attachement" and insert

"attachment";

Signed and Sealed this

Thirteenth Day of May 1986

[SEAL]

Attest:

DONALD J. QUIGG

Attesting Officer　　　Commissioner of Patents and Trademarks